(12) United States Patent
Mueller et al.

(10) Patent No.: US 9,138,830 B2
(45) Date of Patent: Sep. 22, 2015

(54) METHOD FOR PRODUCING A FASTENING DEVICE

(75) Inventors: Joseph Mueller, Hard (AT); Andreas Fasske, Magdeburg (DE)

(73) Assignee: Hilti Aktiengesellschaft, Schaan (LI)

(*) Notice: Subject to any disclaimer, the term of this patent is extended or adjusted under 35 U.S.C. 154(b) by 446 days.

(21) Appl. No.: 12/891,470

(22) Filed: Sep. 27, 2010

(65) Prior Publication Data

US 2011/0076113 A1  Mar. 31, 2011

(30) Foreign Application Priority Data

Sep. 28, 2009 (DE) .................. 10 2009 045 047

(51) Int. Cl.
| | |
|---|---|
| *B23K 31/02* | (2006.01) |
| *F16B 35/06* | (2006.01) |
| *B23K 26/26* | (2014.01) |
| *F16B 35/02* | (2006.01) |
| *F16B 37/14* | (2006.01) |

(52) U.S. Cl.
CPC ............ *B23K 31/027* (2013.01); *B23K 26/265* (2013.01); *F16B 35/02* (2013.01); *F16B 35/06* (2013.01); *F16B 37/145* (2013.01); *B23K 2201/06* (2013.01); *B23K 2201/20* (2013.01); *Y10T 29/49826* (2015.01)

(58) Field of Classification Search
CPC ........ F16B 35/02; F16B 35/06; F16B 37/145; Y10T 29/49826
USPC ........... 470/2, 3, 4, 5, 6, 7, 48, 49, 50, 51, 52, 470/53, 8, 9, 10, 11, 12; 606/286, 289; 411/352, 353; 72/367.1, 368, 51
See application file for complete search history.

(56) References Cited

U.S. PATENT DOCUMENTS

| | | | | |
|---|---|---|---|---|
| 439,830 | A * | 11/1890 | Berbecker ................. | 470/6 |
| 1,098,716 | A * | 6/1914 | Garrison ................... | 470/8 |
| 1,742,201 | A * | 1/1930 | Drissner ................... | 411/396 |
| 2,169,460 | A * | 8/1939 | Broughton ................ | 411/403 |
| 2,366,459 | A * | 1/1945 | Rosa ........................ | 313/238 |
| 2,980,929 | A * | 4/1961 | Cummaro .................. | 470/8 |
| 3,184,769 | A * | 5/1965 | Barwood ................... | 470/4 |
| 3,832,747 | A * | 9/1974 | Nankivell et al. .......... | 470/2 |
| 3,843,984 | A * | 10/1974 | Bagheri et al. ............ | 470/8 |
| 3,924,508 | A * | 12/1975 | DeCaro ..................... | 470/11 |
| 3,945,071 | A * | 3/1976 | Flodin ...................... | 470/63 |
| 4,128,253 | A * | 12/1978 | Powers ..................... | 280/79.11 |
| 5,031,262 | A * | 7/1991 | Baritz ....................... | 470/5 |
| 5,059,211 | A * | 10/1991 | Stack et al. ................ | 623/1.15 |
| 5,584,835 | A * | 12/1996 | Greenfield ................. | 606/232 |
| 5,782,918 | A * | 7/1998 | Klardie et al. ............. | 606/60 |
| 6,186,718 | B1 * | 2/2001 | Fogard ...................... | 411/403 |
| 6,394,724 | B1 * | 5/2002 | Kelly et al. ................ | 411/353 |
| 6,644,903 | B1 * | 11/2003 | Arand ....................... | 411/352 |
| 6,685,409 | B2 * | 2/2004 | Braun et al. ............... | 411/353 |
| 6,953,300 | B2 * | 10/2005 | Chen ........................ | 403/292 |
| 7,131,809 | B2 * | 11/2006 | Dobson ..................... | 411/533 |
| 7,481,829 | B2 * | 1/2009 | Baynham et al. ........... | 606/289 |
| 8,114,141 | B2 * | 2/2012 | Appenzeller et al. ....... | 606/328 |
| 2005/0257591 | A1 * | 11/2005 | Hauger et al. ............. | 72/368 |
| 2006/0235410 | A1 * | 10/2006 | Ralph et al. ............... | 606/72 |
| 2009/0129887 | A1 * | 5/2009 | Chang ....................... | 411/402 |
| 2011/0106177 | A1 * | 5/2011 | Lewis ....................... | 606/305 |

\* cited by examiner

*Primary Examiner* — Edward Tolan
(74) *Attorney, Agent, or Firm* — Crowell & Moring LLP

(57) ABSTRACT

A method for producing a fastening device, in which a head part and a shaft part are joined, is disclosed.

18 Claims, 5 Drawing Sheets

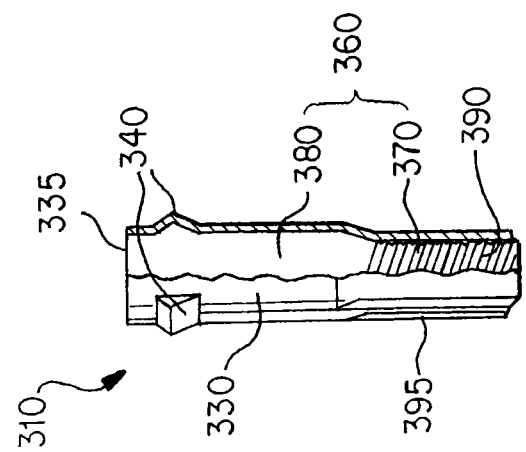
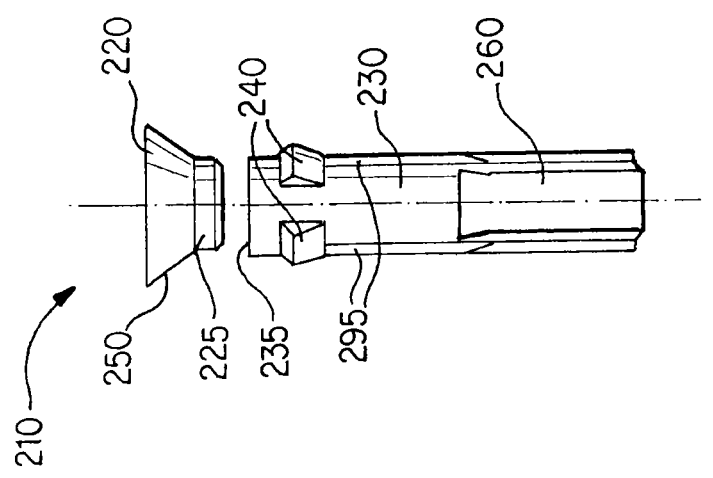

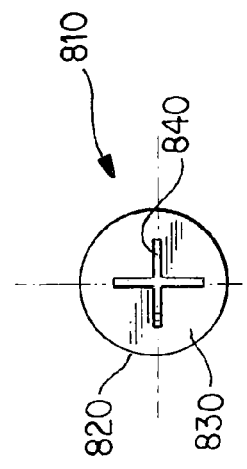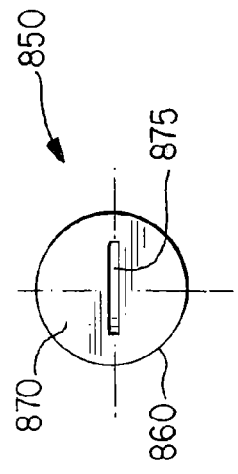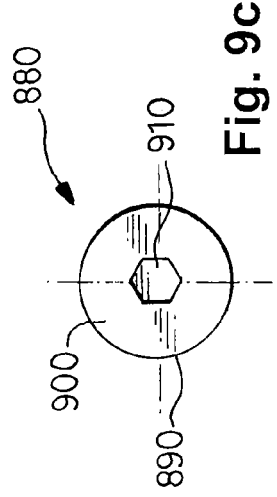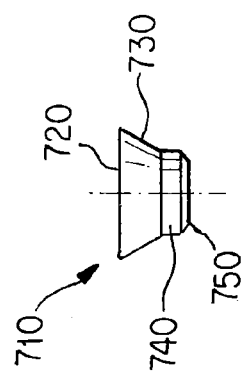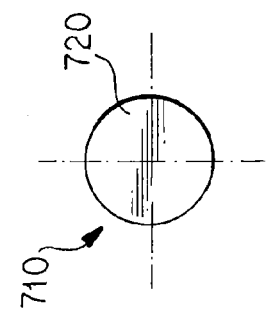

METHOD FOR PRODUCING A FASTENING DEVICE

This application claims the priority of German Patent Document No. 10 2009 045 047.5, filed Sep. 28, 2009, the disclosure of which is expressly incorporated by reference herein.

BACKGROUND AND SUMMARY OF THE INVENTION

The invention relates to a method for producing a fastening device, as well as such a fastening device.

Such devices are usually produced by integrally molding a head part onto a rod-shaped semi-finished product by massive forming and then milling a holder for a counterpart of the fastening device on a side opposite the head part. However, the milling operation in particular causes a great expenditure of time and materials.

It is the object of the present invention to make available a method for producing a fastening device that will consume less time and/or materials.

This object is achieved by a method for producing a fastening device in which a head part is joined to an abutment for a support of an object to be attached, and a shaft part with a holder for a counterpart of the fastening device. The head part and the shaft part are preferably welded together.

A preferred embodiment is characterized in that the shaft part is produced by shaping, in particular bending a semi-finished product. A flat semi-finished product is preferably used.

A preferred embodiment is characterized in that the holder comprises a loading area and an equalizing area having different cross-sections.

A preferred embodiment is characterized in that the holder, the loading area and/or the equalizing area have a circular cross-section. Another preferred embodiment is characterized in that the holder, the loading area, and/or the equalizing area have a polygonal cross-section.

A preferred embodiment is characterized in that the holder, the loading area and/or the equalizing area have a closed profile. A preferred embodiment is characterized in that the holder, the loading area and/or the equalizing area have an open profile.

A preferred embodiment is characterized in that the shaft part is provided with protrusions.

A preferred embodiment is characterized in that the holder, in particular the loading area, is provided with a loading structure. The loading structure especially preferably includes a thread.

A preferred embodiment is characterized in that the head part is produced by massive forming.

A preferred embodiment is characterized in that the abutment comprises a contact surface facing the shaft part. The contact surface especially preferably has an inclined area, in particular a conical area.

A preferred embodiment is characterized in that the head part is provided with a drive.

This object is also achieved by a device for fastening a first object onto a second object, having a head part and a shaft part, wherein the head part has an abutment for a support of the first object, and the shaft part has a holder for a counterpart of the fastening device, and having a joining location, which connects the head part to the shaft part.

The present invention is explained in greater detail below on the basis of exemplary embodiments with reference to the drawings.

BRIEF DESCRIPTION OF THE DRAWINGS

FIG. 3 shows an exploded view of a fastening device;
FIG. 4 shows a side view and a sectional view of a shaft part of a fastening device;
FIGS. 8a and 8b shows a side view and a top view of a head part of a fastening device, respectively;
FIGS. 9a, 9b, and 9c show a top view of three fastening devices.

DETAILED DESCRIPTION OF THE DRAWINGS

Figure 1:
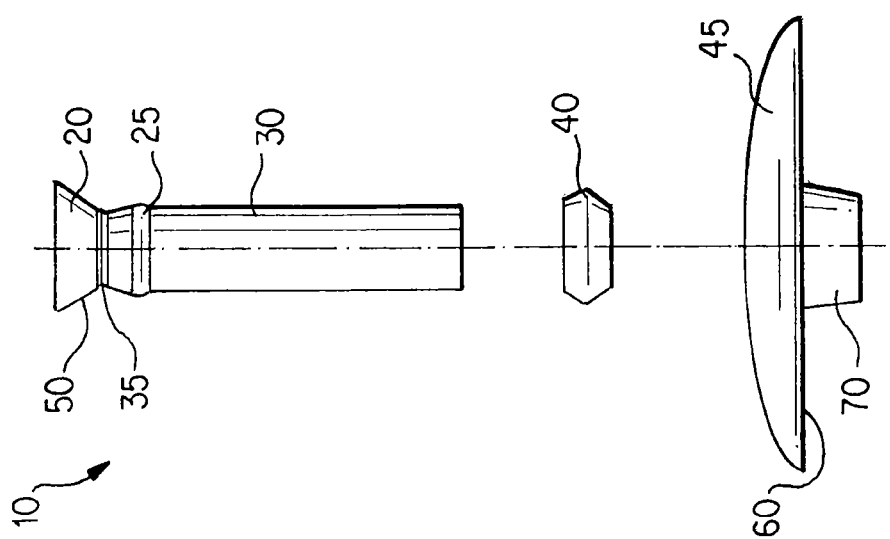
FIG. 1 shows an exploded view of a fastening device.

FIG. 1 shows a device 10 for fastening a first object (not shown) onto a second object (also not shown) in an exploded view. This device 10 has a head part 20, a shaft part 30, a ring-shaped intermediate part 40 and a plate-shaped holding part 45. The head part 20 and the shaft part 30 are welded together at a joining location 25, so that the joining location 25 is designed as a peripheral weld. A laser welding method is preferably used for the joining here. In exemplary embodiments that are not shown here, the head part and the shaft part are joined by means of oxyfuel gas welding, electric arc welding, inert gas shielded arc welding, resistance welding, friction welding, electron beam welding, diffusion welding, hard or soft soldering, or by adhesive bonding.

The head part 20 has a peripheral recess 35, which serves as a seat for the intermediate part 40 as soon as the intermediate part 40 is pulled up over the shaft part 30 onto the head part 20. In addition, the head part has an abutment 50 for a support of the first object (not shown). The abutment 50 is designed as a conical contact surface for contact with the holding part 45, such that this conical contact surface is facing the shaft part 30. In an exemplary embodiment that is not shown here, the abutment has a planar surface or line, especially peripherally, facing the shaft part. The holding part 45 in-turn has a contact surface 60 for contact with the first object (not shown), for example a grating. In addition, the holding part has a collar-shaped feed-through 70 for the shaft part 30. The feed-through is designed to be conical on the outside and preferably also on the inside, in particular to facilitate insertion of the shaft part 30, for example.

Figure 2:
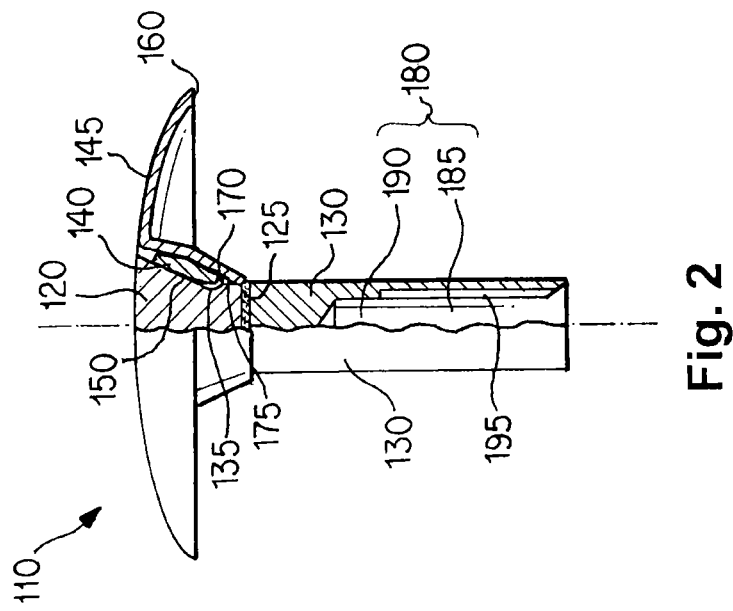
FIG. 2 shows a side view and a sectional view of a fastening device.

FIG. 2 shows a device 110 for fastening a first object (not shown) onto a second object (also not shown) in a side view and a sectional view. This device 110 has a head part 120, a shaft part 130, a ring-shaped intermediate part 140 and a plate-shaped holding part 145. The head part 120 and the shaft part 130 are welded together on a joining surface 125, so that the joining location 125 is designed as a continuous welded connection. The head part 120 has a peripheral recess 135 in which the intermediate part 140 sits.

In addition, the head part has an abutment 150 for a support of the first object (not shown). The abutment 150 is designed as a conical support surface for a support of the holding part 145 which faces the shaft part 130. The holding part 145 in-turn has a contact edge 160 for contact with the first object (not shown). In addition, the holding part has a collar-shaped feed-through 170 for the shaft part 130. The feed-through 170 has a conical inside surface 175, which is opposite the abutment 150, forming a gap, such that the intermediate part 140 is arranged between the abutment 150 and the inside surface 175. Under some circumstances, this prevents or reduces interfering noise during load on the device 110.

The shaft part 130 has a holder 180 for a counterpart (not shown) of the fastening device 110. The holder 180 is designed as a blind hole and has a loading area 185 and an equalizing area 190. The loading area 185 is provided with a peripheral recess 195, in which the object can be secured.

FIG. 3 shows a device 210 for fastening a first object (not shown) onto a second object (also not shown) in an exploded view. The device 210 has a head part 220 and a shaft part 230 with chamfered or rounded longitudinal edges 295.

The head part 220 has a cylindrical area 225 which has smaller outside dimensions, in particular a smaller diameter than the shaft part 230 on its end facing the head part 220, so that the cylindrical area 225 forms a peripheral recess after joining the shaft part 230 to the head part 220, this peripheral recess together with several protrusions 240 with which the shaft part 230 is provided serving as a seat for an intermediate part, for example, a sealing element and/or a damping element or the like or a holding part or the like. The protrusions 240 are uniformly distributed on the circumference of the shaft part 230 and are arranged in particular at an equal distance from the subsequent location 235 for joining to the head part 220. The distance of one or all protrusions 240 from the subsequent joining location 235 is preferably the same as or smaller than the extent of the head part 220, measured in the longitudinal direction of the shaft part 230.

In exemplary embodiments that are not shown here, the shaft part is provided only with a single protrusion or the protrusions are arranged with different distances from one another and/or from the subsequent joining location. In the case of additional exemplary embodiments that are not shown, the cylindrical area has dimensions similar or identical to those of the shaft part, so that the protrusion(s) serve(s) only as a seat. In additional exemplary embodiments that are not shown, only the recess serves as a seat.

The head part 220 preferably has a conical abutment 250 for a support of the first object (not shown). The shaft part 230 has a holder 260 for a counterpart (not shown) of the fastening device 210. The holder 260 has an open profile with one, two or more slots in the longitudinal direction. The holder 260 is designed with a loading structure, preferably an inside thread between the slots. In the exemplary embodiments that are not shown here, the holder has a blind hole or a feed-through passing through the shaft part, with or without a loading structure.

FIG. 4 shows a shaft part 330 of a device 310, which is not shown further here, for fastening a first object onto a second object in a combined side view and sectional view. The shaft part 330 is provided with chamfered or rounded longitudinal edges 395 and protrusions 340, which are uniformly distributed on the circumference of the shaft part 330 and are arranged at the same distance from a subsequent location 335 for joining to a head part (not shown).

The shaft part 330 has a holder 360 for a counterpart (not shown) of the fastening device 310. A holder 360 is designed as a feed-through passing through the shaft part 330 and has a loading area 370 and an equalizing area 380. The loading area 370 is provided with an inside thread 390 into which a counterpart furnished with an outside thread can be screwed. The equalizing area 380 has larger inside dimensions, in particular a larger inside diameter than the loading area, so that under some circumstances, the manufacturing cost and/or complexity for the inside thread 390 is reduced. The equalizing area 380 serves to equalize the space for the counterpart in particular. In an exemplary embodiment that is not shown here, the equalizing area has smaller inside dimensions than the loading area and serves as a stop for the counterpart, for example.

Figure 5:
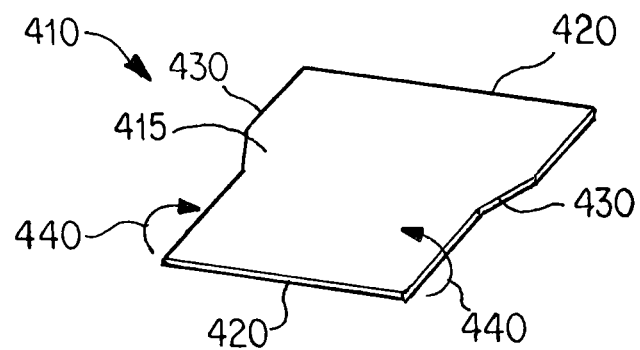
FIG. 5 shows a perspective view of a semi-finished product.

FIG. 5 shows a semi-finished product 410 for producing a shaft part of a device for fastening a first object onto a second object in a perspective view. The semi-finished product 410 has a flat shape and is designed as a sheet made of metal, an alloy, a steel or stainless steel, for example. The semi-finished product 410 has an inside surface 415 having straight transverse edges 420 and S-shaped longitudinal edges 430, so that a width of the semi-finished product measured in the direction of the transverse edges 420 is smaller on the side facing the observer than on the side facing away from the observer.

To produce a shaft part, the semi-finished product 410 is curved into a round shape along the arrows 440 to form a sleeve shape, so that the longitudinal edges 430 are opposite one another. Next the longitudinal edges 430 are joined together, in particular being welded together, so that a shaft part having a closed profile is formed, with a continuous holder, i.e., a holder that is open on both sides, being formed in its interior. A laser welding method is preferably used for joining. In exemplary embodiments that are not shown here, the longitudinal edges are joined by means of oxyfuel gas welding, electric arc welding, inert gas shielded arc welding, resistance welding, frictional welding, electron beam welding, diffusion welding, hard soldering or soft soldering or adhesive bonding.

Because of the difference in width of the semi-finished product on different sides, a holder having a cylindrical loading area of a smaller inside diameter and a cylindrical equalizing area of a larger inside diameter is formed. With this method, it is possible to save on both time and materials in comparison with milling of a holder of a solid material. In exemplary embodiments that are not shown here, two or more flat semi-finished products are shaped into half cylinders and/or partial cylinders to produce a shaft part, such that two longitudinal edges are opposite one another at several locations on the circumference, and these edges are then joined to one another.

As an additional process step, a loading structure is molded shaped into the holder. An inside thread is preferably shaped into the loading area, in particular being cut there. Before or after that, the shaft part is joined to the head part along one of the transverse edges 420, in particular on the wider transverse edge. The joining to the head part is preferably performed simultaneously with and/or in a single method step with the joining of the longitudinal edges 430. However, in exemplary embodiments that are not shown here, the joining to the head part is performed before or after the joining of the longitudinal edges.

Figure 6:
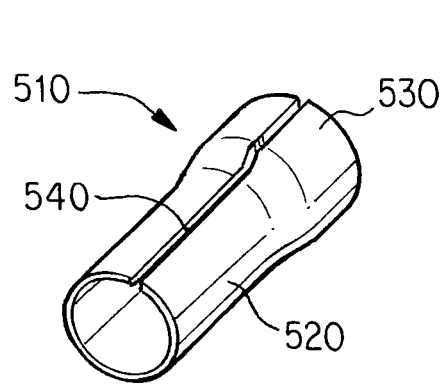
FIG. 6 shows a perspective view of a shaft part of a fastening device.

FIG. 6 shows a shaft part 510 of a device for attaching a first object onto a second object in a perspective view. The shaft part 510 has a loading area 520 as well as an equalizing area 530, each having a circular cross-section, such that the equalizing area 530 has a larger inside diameter than the loading area 520.

The shaft part 510 is designed as an open profile having a longitudinal gap 540. In contrast with the equalizing area 530, the loading area 520 is provided with a loading structure designed as an inside thread.

Figure 7:
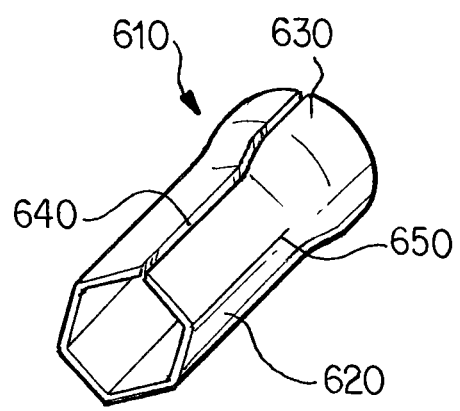
FIG. 7 shows a perspective view of a shaft part of a fastening device.

FIG. 7 shows a shaft part 610 of a device for fastening a first object onto a second object in a perspective view. The shaft part 610 has a loading area 620 with a hexagonal cross-section and an equalizing area 630 with a circular cross-section, such that the equalizing area 630 has larger inside dimensions than the loading area 620. The longitudinal edges 650, which are formed by the six corners of the cross-section of the loading area, are rounded or chamfered.

In exemplary embodiments which are not shown here, the loading area and/or the equalizing area have a triangular, rectangular, pentagonal, octagonal, decagonal or dodecagonal cross-section with the same or different side lengths.

The shaft part 610 is designed as an open profile having a longitudinal gap 640. In contrast with the equalizing area 630, the loading section 620 is provided with a loading structure designed as an inside thread. Due to the polygonal cross-section of the loading area, it is sufficient to produce the inside thread in the center of the side faces of the respective polygon.

FIG. 8 shows a head part 710 of a device for fastening a first object onto a second object in a side view (FIG. 8a) and in a top view (FIG. 8b). The head part 710 has a circular drive surface 720 and an abutment 730 designed as a conical contact surface for contact of a first object to be attached. In addition, the head part 710 has a cylindrical protrusion 740 with a chamfered peripheral edge 750. The head part 710 is preferably produced by massive forming, especially preferably by flow pressing. In an exemplary embodiment that is not shown here, the head part is produced by means of milling.

The head part is preferably made of a metal, an alloy, a steel or stainless steel. The head part is especially preferably made of the same material as the respective shaft part. However, in exemplary embodiments that are not shown here, the head part and/or the shaft part are made of plastic and in particular are applied to the respective other one of the two parts by an injection molding process. According to additional exemplary embodiments that are not shown here, a holding part such as that shown in FIG. 1 or 2, for example, is made of plastic and in particular is attached to the head part and/or the shaft part by means of an injection molding process.

According to a variant that is preferred in particular, the head part is made of a metal, an alloy, a steel, stainless steel or some other material which has a high hardness, provided with a drive and sheathed with a combined shaft and holding part made of plastic, so that the drive is stable for engagement of a tool, and the shaft part and the holding part are designed from a lightweight and/or inexpensive material.

FIG. 9 shows three devices 810 (FIG. 9a), 850 (FIG. 9b), 880 (FIG. 9c) for attaching a first object onto a second object, each shown in a view from above. The device 810 has a head part 820 with a circular drive surface 830. The drive surface 830 has a drive 840, which is designed as a cross recess, which is used for engagement of a tool (not shown). With the help of this tool, it is possible in particular to screw the device 810 onto a counterpart designed as a screw having an outside thread and thus to attach a first object, for example, a grating, to a second object, for example, a substrate. The counterpart is preferably designed as a direct-fastening element, which is driven into the substrate with the help of a setting tool. According to an especially preferred exemplary embodiment, the counterpart is anchored in a borehole in the substrate by means of a dowel, for example.

The device 850 has a head part 860 with a circular drive surface 870. The drive surface 870 has a drive 875 designed as a longitudinal slot, which serves to allow engagement of a tool (not shown). The device 880 has a head part 890 with a circular drive surface 900. The drive surface 900 has a drive 910 designed as a hexagon socket, serving to allow engagement of a tool (not shown).

Figure 10:
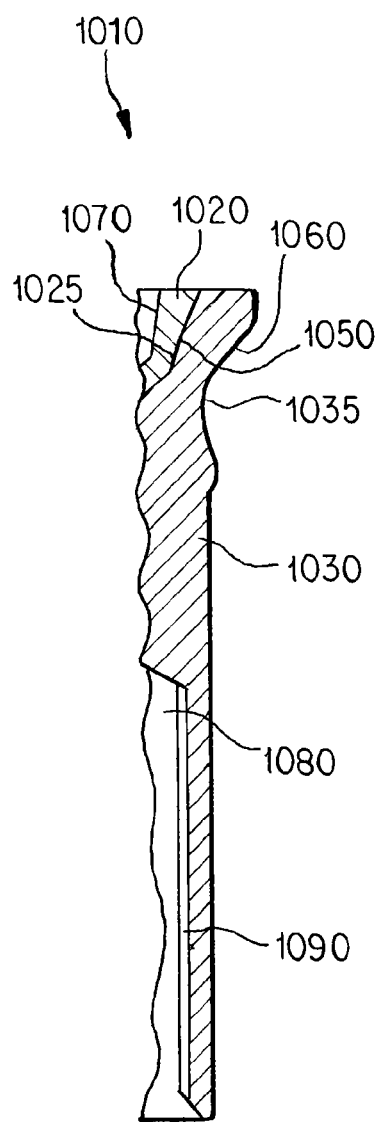
FIG. 10 shows a sectional view of a fastening device.

FIG. 10 shows a device 1010 for fastening a first object (not shown) to a second object (also not shown) in a longitudinal sectional view. The device 1010 has a head part 1020, a shaft part 1030 and a plate-shaped holding part (not shown). The head part 1020 and the shaft part 1030 are bonded to one another at a joining surface 1025. The shaft part 1030 has a peripheral recess 1035, in which the holding part sits. In addition, the head part 1020 has an abutment 1050 for a support of the first object (not shown). The abutment 1050 is designed as a conical contact surface, which overlaps with the joining surface 1025, in particular corresponding to the joining surface 1025. The shaft part 1030 in-turn has a contact surface 1060 for contact of the holding part (not shown). The shaft part 1030 also has a holder 1080 designed as a blind hole for a counterpart (not shown) of the fastening device 1010. The holder 1080 is provided with a loading structure 1090 designed as a thread in particular in which the counterpart is held.

The head part 1020 has a drive 1070 which is designed in particular as a hexagon socket and which serves to allow engagement of a tool (not shown). With the help of this tool, it is possible in particular to screw the device 1010 onto a counterpart designed as a screw with an outside thread and thus to attach a first object, for example, a grating, onto a second object, for example a substrate.

For the transmission of force and/or torque from the tool to the head part 1020, the head part 1020 is preferably manufactured from a first material, in particular a metal or an alloy, for example, steel or stainless steel, a ceramic or the like. The shaft part 1030 is preferably manufactured from a second material, in particular plastic, which is different from the first material and is cast on or integrally molded onto the head part 1020 in particular. For transmission of a force and/or torque from the head part onto the shaft part 1030, the joining surface 1025 and/or the abutment 1050 has a profile which forms a form-fitting connection between the head part 1020 and the shaft part 1030. The profile therefore has a cross-section with a noncircular perimeter. The perimeter is in particular elliptical, a regular or irregular polygon and/or has one or more protrusions and/or recesses.

Figure 11:
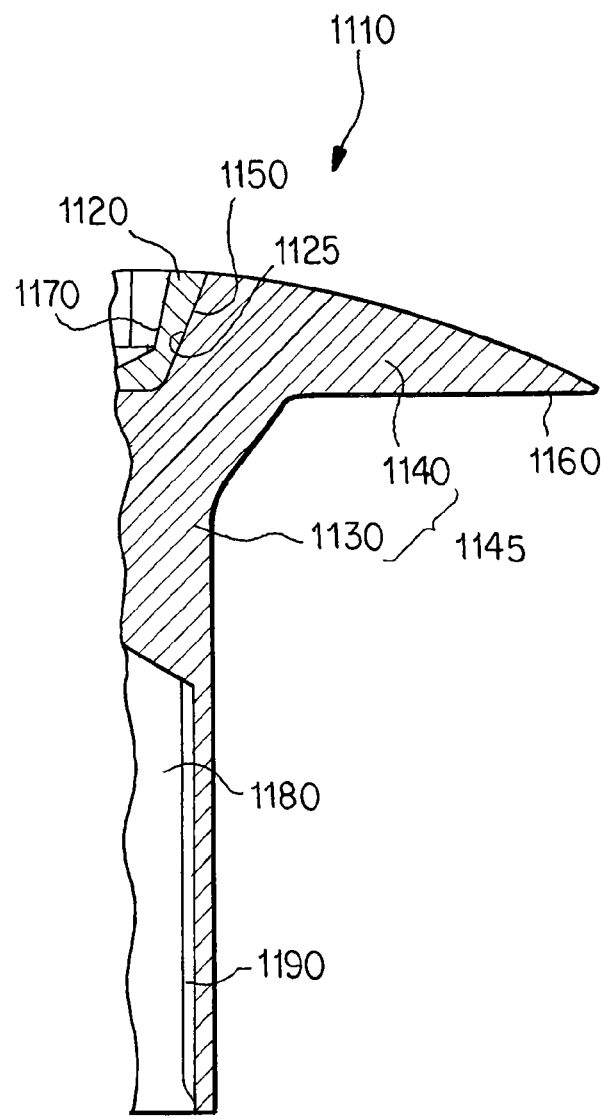
FIG. 11 shows a sectional view of a fastening device.

FIG. 11 shows a device 1110 for fastening a first object (not shown) onto a second object (also not shown) in a longitudinal sectional view. The device 1110 has a head part 1120 and a combined shaft and holding part 1145 having a shaft area 1130 and a plate-shaped holding area 1140. The head part 1120 and the combined shaft and holding part 1145 are bonded to one another, substance-to-substance, at a joining surface 1125. The head part 1120 has an abutment 1150 for a support of the first object (not shown). The abutment 1150 is designed as a conical contact surface, which overlaps with the joining surface 1125, in particular corresponding to the joining surface 1125. The combined shaft and holding part 1145 in-turn has a contact surface 1160 in its holding area 1140 for contact of the first object (not shown). The combined shaft and holding part 1145 also has a holder 1180, which is designed as a blind hole in its shaft area 1130, for a counterpart (not shown) of the fastening device 1110. The holder 1180 is provided with a loading structure 1190, which is designed in particular as a thread and in which the counterpart is held.

The head part 1120 has a drive 1170, which is designed as a hexagon socket and serves to provide engagement for a tool (not shown). With the help of this tool it is possible in particular to screw the device 1110 onto a counterpart, which is designed as a screw with an outside thread.

For a transmission of force and/or torque from the tool to the head part 1120, the head part 1120 is preferably made of a first material, in particular a metal or an alloy, for example, steel or stainless steel, a ceramic or the like. The combined shaft and holding part 1145 is preferably manufactured from a second material, which is different from the first material and is plastic in particular, and is cast on or integrally molded onto the head part 1120 in particular. For a transmission of force and/or torque from the head part 1120 to the combined shaft and holding part 1145, the joining surface 1125 and/or the abutment 1150 has a profile, which forms a form-fitting connection between the head part 1120 and the shaft part 1130. The profile therefore has a cross-section with a noncircular perimeter. The perimeter is in particular elliptical, a regular or irregular polygon and/or has one or more protrusions and/or recesses.

The present invention has been described on the basis of examples of a device for fastening a first object onto a second object as well as a manufacturing method for such a device. The features of the embodiments described here may also be combined with one another in any desired manner within a single fastening device and/or a single manufacturing method. It should also be pointed out that the inventive device and the inventive method are also suitable for other purposes.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a fastening device, comprising the steps of:
   producing a shaft part by curving a flat semi-finished product into a round shape to form a sleeve shape;
   joining a head part to the shaft part, wherein the head part has an abutment for support of an object to be attached and wherein the shaft part defines a bore within the shaft part for a counterpart of the fastening device; and
   inserting the shaft part through a plate-shaped holding part and contacting the plate-shaped holding part with the abutment of the head part;
   wherein the step of inserting the shaft part through the plate-shaped holding part includes inserting the shaft part through a collar-shaped feed-through of the plate-shaped holding part and wherein the collar-shaped feed-through is conical on an outside and an inside of the feed-through.

2. The method according to claim 1, wherein the head part and the shaft part are welded together.

3. The method according to claim 1, wherein the bore includes a loading area and an equalizing area having different cross-sections.

4. The method according to claim 1, wherein the bore has a circular cross-section.

5. The method according to claim 1, wherein the bore has a polygonal cross-section.

6. The method according to claim 3, wherein the loading area and/or the equalizing area have a closed profile.

7. The method according to claim 3, wherein the loading area and/or the equalizing area have an open profile.

8. The method according to claim 1, wherein the shaft part is provided with protrusions.

9. The method according to claim 1, wherein the bore includes a loading structure.

10. The method according to claim 9, wherein the loading structure includes a thread.

11. The method according to claim 1, wherein the head part is produced by massive forming.

12. The method according to claim 1, wherein the abutment comprises a contact surface facing the shaft part.

13. The method according to claim 1, wherein the head part is provided with a drive.

14. The method according to claim 1, wherein the bore is a blind hole.

15. The method according to claim 1, wherein the bore is a feed-through passing through the shaft part.

16. The method according to claim 1, wherein longitudinal edges of the flat semi-finished product are joined together such that the shaft part has a closed profile.

17. The method according to claim 1, wherein a gap is defined between longitudinal edges of the flat semi-finished product such that the shaft part has an open profile.

18. The method according to claim 1, further comprising the step of pulling up an intermediate part over the shaft part and onto the head part and seating the intermediate part in a peripheral recess of the head part.

* * * * *